United States Patent [19]
Ehrhardt et al.

[11] 3,819,397
[45] June 25, 1974

[54] METHOD OF FORMING IMPROVED PRESSURE SENSITIVE TRANSFER MEDIA

[76] Inventors: Gerry H. Ehrhardt, 1705-19th St., West Des Moines, Iowa 50309; Timothy G. Abernathy, 8621 Primrose Ln., Clive, Iowa 50053

[22] Filed: Dec. 8, 1971

[21] Appl. No.: 205,940

Related U.S. Application Data
[63] Continuation-in-part of Ser. No. 858,362, Sept. 16, 1969, abandoned.

[52] U.S. Cl..................... 117/36.1, 117/158, 106/31
[51] Int. Cl............................................. B41m 5/10
[58] Field of Search...................... 117/36.1; 106/31

[56] References Cited
UNITED STATES PATENTS
| | | | |
|---|---|---|---|
| 3,387,986 | 6/1968 | Elbert et al. | 117/36.1 |
| 3,484,264 | 12/1969 | Strauss et al. | 117/36.1 |

*Primary Examiner*—Murray Katz
*Attorney, Agent, or Firm*—Robert E. Isner, Esq.

[57] ABSTRACT

Process for forming image transfer media of improved character by coating a substrate with a uniform dispersed suspension of a filler, coloring matter and a solvent having a wax-like material dissolved therein and thereafter precipitating said wax-like material, in situ, by rapidly cooling the applied suspension with concurrent evaporation of the solvent.

11 Claims, 2 Drawing Figures

PATENTED JUN 25 1974 3,819,397
Fig. 1
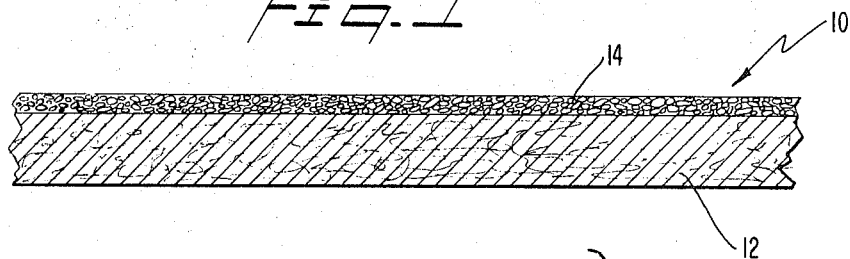
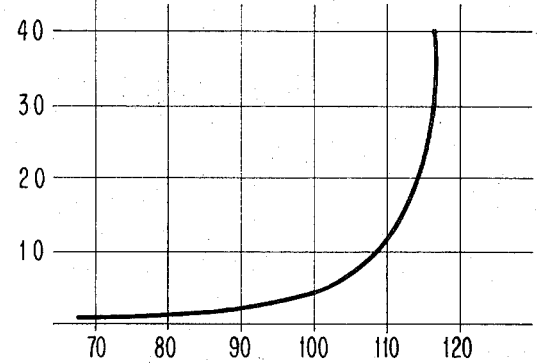
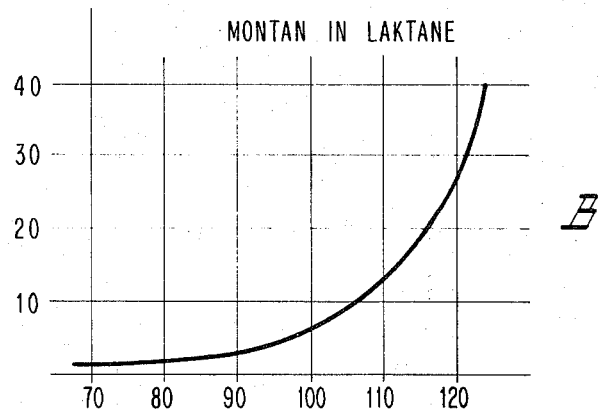
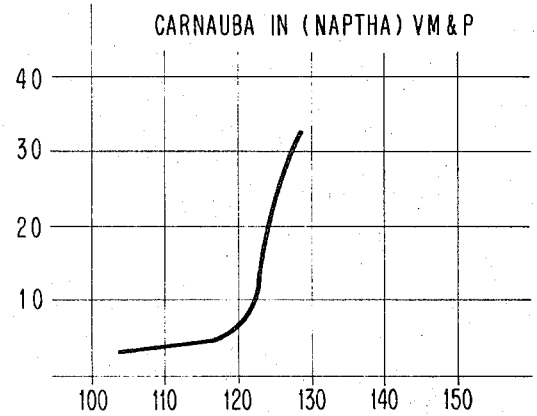
Fig. 2
INVENTORS
GERRY H. EHRHARDT
TIMOTHY G. ABERNATHY
BY
Robert E. Isner
ATTORNEY

METHOD OF FORMING IMPROVED PRESSURE SENSITIVE TRANSFER MEDIA

This application is a continuation-in-part of our co-pending application Ser. No. 858,362 filed Sept. 16, 1969 now abandoned.

This invention relates to pressure sensitive image transfer media and more particularly to an improved carbon paper composition and method of fabricating the same.

Pressure sensitive image transfer media of the conventional "hot melt" types of carbon paper, wherein a hot liquid coating formed of various waxes, oils and pigments is applied to a carrier paper and subsequently set or solidified by cooling have long been employed in the duplicating arts. The recognized deficiencies of such type formulations, such as a high degree of susceptibility to smudging and smearing and generally poor release characteristics which necessitate the utilization of relatively heavy coatings thereof, have occasioned, at least in part, the development of the more recent "sponge carbon" types of transfer media. In this latter type of media a mixture of resins, plasticizers, and pigments are dispersed in solvents and applied to a carrier substrate, after which evaporation of the solvents operates to leave an image transfer coating on the surface thereof consisting of a mass of pigment and oils, held together by the resinous components thereof. While these latter types of coatings have ameliorated at least some of the recognized deficiencies of the hot melt carbons, the improvements thereover are essentially ones of degree only and such transfer media are still generally characterized by undue amounts of smudging and smearing, generally poor release characteristics, lack of uniformity of deposition and intensity and undesired bleeding of oil or plasticizers from the coating into the substrate.

The increasing use of data processing equipment and its attendant automated accessory and handling equipment and the increasing demand for increased numbers of copies in high speed printers and like apparatus has accentuated the deficiencies of available transfer media and created a demand for improved transfer media capable of producing transfer images of improved character, and in particular transfer images which are more highly smear and smudge resistant, have markedly increased uniformity of definition and intensity in multiple copies and which are capable of producing and reproducing effectively identical signal levels in automatic sensing equipment.

In both the hot melt and sponge types of carbon paper, a high degree of smudge and smear resistance, sharpness of transfer and intensity of transferred image constitute essentially antithetical requirements and the presence of a greater degree of one such advantageous characteristic can normally be obtained only at the expense of the others.

This invention may be briefly described as an improved method of forming an image transfer coating on a carrier substrate and an improved pressure sensitive image transfer media resulting therefrom that is, or may be, substantially devoid of oils or plasticizers and is possessed of markedly improved smear resistance and release characteristics as compared to conventionally formulated image transfer media of the hot melt and sponge carbon types.

Among the advantages attendant the subject invention is the provision of a simple and economic method of fabrication of a pressure sensitive image transfer media of improved character having an effectively complete release of the transferred image from a carrier substrate with a consequent permitted use of thinner transfer films in association with appreciably higher degrees of smear and smudge resistance, sharpness of transfer and uniformity of both deposition and intensity of the transferred image.

The object of this invention is the provision of an improved pressure sensitive image transfer media and method of fabricating the same.

A still further object of this invention is the provision of an improved pressure sensitive image transfer media containing at most only minimal amounts, if any at all, of oils or plasticizers in the transfer coating thereof with a consequent minimization, if not effective avoidance, of bleeding thereof onto the carrier substrate or an adjacent image receiving sheet.

Other objects and advantages of the invention will be pointed out in the following specification and claims and will be apparent from the accompanying drawing which illustrates one embodiment incorporating the principles of the invention and certain of the operative parameters involved.

FIG. 1 is an enlarged vertical sectional view of a transfer medium consisting of a transferrable coating formulated in accord with the principles of this invention and the carrier sheet.

FIG. 2 is a graphical presentation schematically illustrating the solubility characteristics of certain of the materials employed.

As illustrated in FIG. 1, the transfer media 10 generally comprises a carrier sheet or substrate 12 having a transfer coating 14 disposed at least on one surface thereof. The carrier sheet 12 can be any type of film or carbonizing tissue conventionally employable for transfer media. The transfer coating 14, however, is of novel and improved character and, apart from being of reduced thickness, is essentially characterized, inter alia, by the presence of at most only minimal amounts, if any at all, of oils or plasticizers therein.

In the broader aspects of the practice of the subject invention, a thin layer of a hot uniformly dispersed liquid suspension of a filler; coloring matter and a solvent having a wax or wax-like material (hereinafter individually or collectively sometimes designated wax or waxy component or constituent) dissolved therein, is applied to the carrier substrate, such liquid layer is then rapidly cooled to effect selective precipitation of the wax from the solvent in situ, during and after which the solvent is evaporated, preferably at a temperature below the softening point of the waxy constituent to leave the improved coating as the residuum thereof, which residuum will usually contain therein no more than about 5 percent of unevaporated solvent.

In the preferred practice of the invention the filler may suitably constitute inert mineral kaolin or like materials, supplemented if desired by small quantities of filler having colorant properties, such as titanium dioxide.

The coloring matter or colorant included in the coating may consist of any of the well known coloring agents such as carbon black, milori blue or various pigments or dyes. The amount of colorant employed is generally quite small and does not appear to be attendant with any degree of criticality.

The amount of filler and colorant may constitute as much as 90 to 95 percent of the finished coating (assuming zero remaining unevaporated solvent) but usually will range from 50 to 80 percent thereof. The particle size of the filler can be varied with the type and amount of wax and wax-like materials employed to produce optimum coating characteristics and we have found that use of filler particles above 50 microns generally results in an undesired degree of transfer coating cohesiveness and that use of filler particles below 0.10 micron generally results in an undesired lack of cohesiveness.

The wax or wax-like materials included in the finished coating can vary from as little as 5 percent thereof to as much as 40 percent thereof or even greater depending upon the particular material employed. In general, however, the wax or wax-like material will preferredly constitute about 10–30 percent of the finished coating.

Conventional hot melt type coatings usually incorporate a minimum of about 2 lbs of transfer coating per 300,000 square inches of carrier substrate surface. Transfer coatings formed in accordance with the principles of this invention having all of the above discussed desirable characteristics can incorporate as little as 1 lb of transfer coating per 300,000 square inches of carrier substrate surface. As indicated earlier, the wax component of the finished coating may vary from as little as 5 percent thereof to as much as 40 percent thereof or sometimes even greater. In order to provide a basis for the relationships hereinafter set forth, the actual amount of wax to be incorporated in a finished coating per unit surface area of substrate will be herein termed "the requisite wax content" thereof.

In the practice of the invention the uniformly dispersed liquid suspension applicable to the carrier substrate is preferably formed by initially dissolving an amount of wax sufficient to provide the requisite wax content of the finished coating in a suitable solvent at a temperature above the cloud point of the particular wax-solvent combination involved after which the filler and colorants are dispersed therein. The amount of solvent should be sufficient to initially completely dissolve the wax constituent at such temperature above the cloud point thereof and to thereafter provide a dispersion of suitable flow characteristics when the filler and colorant components are mixed therewith. In general, initial wax-solvent solutions having from 10–20 percent wax concentration on a weight basis (i.e., gr. wax/gr. wax plus gr. solvent) have proved suitable. If the percentage of wax is too high in the initial wax-solvent solution, the final suspension will be too thick for proper application to the carrier substrate. Wax concentrations somewhat below 10 percent do not appear to present any basic problems as to operability but do pose problems of economics because of excessive solvent usage attendant thereto.

In addition to the wet and dry basis range of constituent quantities involved, certain physical property relationships between the wax component and the selected solvent are attended by a high degree of criticality. First, the wax constituents that may be employed in the practice of this invention are apparently limited in number and should be of such character that, for the selected solvent-wax solution containing sufficient wax to provide the requisite wax content in the finished coating:

a. the selected wax constituent must be less than 10 percent soluble in the selected solvent on a weight basis at a temperature of about 100°F;

b. such selected wax constituent must also be highly soluble (i.e., 30 percent or more on a weight basis) in the selected solvent at temperatures above 100°F and below 150°F so as to assure that, at the time of elevated temperature application of the hot coating suspension to the substrate, the wax constituent is completely dissolved in the solvent;

c. the cloud point of the selected wax/solvent combination in the concentration employed in the initial solution must be below 150°F;

d. the selected initial wax-solvent combination must have a solubility relationship such that, at temperatures above 100°F, at least 60 percent and preferably at least 65 percent of the dissolved requisite wax content will precipitate from the solvent in crystalline form within a temperature drop of 10°F during cooling below the cloud point thereof.

In addition to the above, the solvent employed must be of sufficient volatility as to permit a rapid rate of evaporation thereof from the applied coating within conventional machine design parameters and at all temperatures ranging from that of the application temperature of the coating to the substrate to temperatures well below the softening point of the wax constituent employed.

In general, the above requirements are satisfied by those waxes that have an asymptotic type solubility curve with increased temperature in the proper selected solvent and which rapidly crystallize out, forming crystals that have an apparent affinity for the pigment and filler, within the above delineated very small drop in temperature and which operate to produce a finished film having less than 10 percent remaining wax present in solution at a temperature of 72°F. Ideally, of course, the requisite wax content of the wax constituent should be 100 percent soluble at temperature $T_1$ and 0 percent soluble at temperature $T_2$ and wherein $T_1 - T_2$ is around 10°F. or less. Such ideal, however, is difficult to obtain and practical considerations appear to dictate that the wax-solvent solubility relationship be such that at least 60 to 65 percent of the dissolved wax precipitate out within a 10 to 15°F. temperature differential and preferably such that at least 65 percent of the dissolved wax will precipitate out within a 10°F. temperature differential. As illustrated in FIG. 2, such relationship can be expressed in terms of the shape of the solubility curve and combinations such as the following appear to possess the requisite asymptotic characteristics:

| Wax | | Solvent |
|---|---|---|
| Carnauba | in | Laktane |
| Montan | in | Laktane |
| Carnauba | in | Naphtha |

By way of specific example and as also illustrated in FIG. 2a, carnauba wax when dissolved in Laktane, which is a trade name of Humble Oil & Refining Co. for a petroleum distillation cut and which is believed to be a blend of about 50 percent cycloparaffins and 30 percent paraffins and 20 percent toluene, has a solubility of about 2 percent at 87°F, about 4 percent at 100°F, about 11 percent at 110°F and a solubility of well over 35 percent at 117°F. A generally similar asymptotic relationship is illustrated in FIGS. 2b and 2c for montan wax in Laktane and for carnauba wax in VM & P (Varnish Makers and Painters) naphtha. In contradistinction therewith, the solubility curve of Carnauba wax in turpentine is of generally constant slope, rather than asymptotic in character, showing a solubility of about 5 percent at 106°F; 12 percent at 115°F; 20 percent at 125°F; 27 percent at 135°F; 30 percent at 140°F and about 35 percent at 149°F and such combination is not suitable for use.

Other combinations which, although curves are not yet available, may possess the desired characteristics, are

| | |
|---|---|
| Montan | Laktane, Ethyl Alcohol |
| Carnauba | Xylene or Toluene |
| Carnauba | Mineral Spirits |

By way of specific examples, the following formulations have produced acceptably good coatings in the practice of this invention, the dry basis formulations assuming the presence of no unevaporated solvent in the coating:

| | A - Blue Coated Sheets | Wet Basis | % Wax Concentration (Weight Basis) in Initial Solution | Finished Coating (Dry) Basis |
|---|---|---|---|---|
| Ex. 1 | Carnauba | 5 | | 10 |
| | Kaolin Clay | 40 | | 80 |
| | Iron Blue Pigment | 4 | | 8 |
| | | | 9.1 | |
| | Alkali Blue (Flushed) | 1 | | 2 |
| | Laktane | 50 | | — |
| Ex. 2 | Carnauba Wax | 110.0 | | 20 |
| | Kaolin Clay | 36.0 | | 72 |
| | Iron Blue | 3.0 | 16.7 | 6 |
| | Alkalai Blue | 1.0 | | 2 |
| | Laktane | 50.0 | | — |
| Ex. 3 | Montan Wax | 10 | | 25.0 |
| | Kaolin Clay | 24.2 | | 60.5 |
| | Carbon Black | 0.8 | | 2.0 |
| | | | 14.3 | |
| | Iron Blue | 4.0 | | 10.0 |
| | Methyl Violet Base | 0.2 | | .5 |
| | Kelacen F | 0.8 | | 2.0 |
| | Laktane | 60.0 | | — |
| Ex. 4 | Petrolatum | 2.0 | | 5.0 |
| | Montan Wax | 8.0 | | 20.0 |
| | Kaolin Clay | 24.2 | | 60.5 |
| | | | 11.8 | |
| | Carbon Black | 0.8 | | 2.0 |
| | Iron Blue | 4.0 | | 10.0 |
| | Methyl Violet Base | 0.2 | | .5 |
| | Kelacen F | 0.8 | | 2.0 |
| | Laktane | 60.0 | | — |
| | B - Black Coated Sheets | | | |
| Ex. 5 | Carnauba Wax | 10.0 | | 20.0 |
| | Kaolin Clay | 37.5 | 16.7 | 75.0 |
| | Carbon Black | 2.5 | | 5.0 |
| | VM&P Naphtha | 50.0 | | — |
| Ex. 6 | Carnauba Wax | 10.0 | | 25.0 |
| | Kaolin Clay | 25.2 | | 63.0 |
| | Carbon Black | 4.0 | | 10.0 |
| | | | 14.3 | |
| | Kelacen F | 0.8 | | 2.0 |
| | Laktane | 60.0 | | — |
| Ex. 7 | Carnauba Wax | 11.0 | | 22.0 |
| | 132°Paraffin | 2.0 | | 4.0 |
| | Paraffin Oil | 2.0 | | 4.0 |
| | | | 20.6 | |
| | Carbon Black | 5.0 | | 10.0 |
| | Titanium Dioxide | 3.0 | | 6.0 |
| | Kaolin Clay | 27.0 | | 54.0 |
| | Laktane | 50.0 | | — |
| Ex. 8 | Montan Wax | 6.0 | | 12.0 |
| | Carnauba Wax | 1.0 | | 2.0 |
| | | | 12.28 | |
| | Kaolin Clay | 32.0 | | 64.0 |
| | Carbon Black | 5.0 | | 10.0 |
| | TiO2 | 5.0 | | 10.0 |
| | Kelacen F | 1.0 | | 2.0 |
| | Laktane | 50.0 | | — |
| | C - Magnetic Ink | | | |
| Ex. 9 | Montan Wax | 6.0 | | 15.0 |
| | Stearic Acid | 4.0 | | 10.0 |
| | Kaolin Clay | 7.2 | | 18.0 |
| | Magnetic material | 20.0 | 14.3 | 50.0 |
| | Kelacen F | 0.8 | | 2.0 |
| | Nigrosine Dye | 2.0 | | 5.0 |
| | Laktane | 35.0 | | — |
| | Ethyl Alcohol | 25.0 | | |

In the practice of the subject process, the wax is soluble, i.e., completely dissolved, in the solvent at the time of suspension application and although not fully understood at the present time, the subsequent rapid drop in temperature apparently effects a selective precipitation of the wax and a crystallization thereof that is believed to uniformly engage and be interspersed with the particles of pigment and filler and to thereby produce a coating of extreme cleanliness that is characterized by a high percentage of inert materials. The selected wax constituent is desirably possessed of both adhesive and cohesive properties and the resultant effective nature of the adhesive and cohesive characteristics have been obtained by proportioning of constituents within the following broad ranges in the applied dispersions, i.e., on a wet basis:

| Wax or wax-like materials | 5 to 30% |
|---|---|
| Filler | 20 to 50% |
| Coloring Matter | ½ to 20% |
| Solvent | 30 to 70% |

As noted above the product resulting from the herein described process is of markedly improved character. Apart from being characterized by a marked absence of oils and plasticizers it is possessed of an extremely high percentage of inerts or non-combustible materials, i.e., fillers and pigments, as compared to combustibles, i.e. wax. In contradistinction to conventionally formulated transfer sheets, the product of this invention will normally have a coating constituted by over 50 percent, and often as high as 85 percent, of inert materials.

As will be apparent from the foregoing examples, coatings may be formulated with no oils or plasticizers therein at all or may contain minimal amounts thereof. As a practical matter the subject coatings, due to the high percentage of filler therein, can tolerate or accommodate up to as much as 10 to 15 percent of oils or plasticizers therein without deleterious bleeding. However, as evidenced by the foregoing, the subject invention essentially eliminates the need for oils and plasticizers characteristic of conventional hot melt and sponge carbon formulations and in the absence thereof produces a singularly hard and smudge free coating.

We have found that image transfer can be effected by media fabricated in accord herewith at temperatures as low as −150°F and as high as 130°F. This is highly advantageous and unusual since most wax melt material presently available will not transfer below 0°F and tends to melt about 120°F. Moreover, the media of the present invention is such that it will not transfer after being subjected to temperatures greater than the softening point of the wax employed, thus facilitating ready control of information block out when desired.

Having thus described our invention, we claim:

1. In the formation of pressure sensitive indicia transfer sheets having a predetermined requisite wax content of 5 to 40 percent in a transfer coating thereon, the steps of applying a uniform dispersed hot suspension of a solvent having the requisite wax content of a wax-like material initially dissolved therein, an inert mineral filler having a particle size in the range of 0.1 to 50 microns and coloring matter to a substrate at a temperature above the cloud point of the wax-like material in the solvent to form a thin coating thereon, said initial solution of solvent and wax-like material dissolved therein being characterized by a relatively high solubility of said wax-like material therein above a predetermined first temperature that is substantially greater than 72°F and below the cloud point thereof, a relatively low solubility of said wax-like material therein at temperatures below said first predetermined temperature and further characterized by an asymptotic solubility curve having a shape such as to permit rapid precipitation of the major portion of the dissolved requisite wax content therefrom within a temperature drop of about 15°F during cooling below the cloud point thereof, and having suspended therein said filler and coloring matter in a total amount to constitute between about 50 to 95 percent by weight of the finished coating, rapidly cooling said applied suspension to reduce the temperature thereof to a value well below that of said first predetermined temperature with concurrent evaporation of said solvent to effect selective precipitation of said major portion of said requisite wax content from said solvent in said applied coating, and continuing evaporation of said solvent from said coating to provide a finished transfer coating.

2. In the formation of pressure sensitive indicia transfer sheets having a predetermined requisite wax content of 5 to 40 percent in a transfer coating thereon, the steps of applying a uniform dispersed hot suspension of a solvent having the requisite wax content of a wax-like material initially dissolved therein, an inert mineral filler having a particle size in the range of 0.1 to 50 microns, and coloring matter to a substrate at a temperature above the cloud point of the wax-like material in the solvent to form a thin coating thereon, said initial solution of solvent and wax-like material dissolved therein being characterized by a cloud point below 150°F, a solubility of wax-like material greater than 30 percent by weight at temperatures above 100°F and less than 10 percent by weight at about 100°F, and an asymptotic solubility curve having a shape such as to permit rapid precipitation of at least 60 percent of said requisite wax content therefrom within a temperature drop of 10°F during cooling below the cloud point thereof, and having suspended therein said filler and coloring matter in a total amount to constitute between about 50 to 95 percent by weight of the finished coating, rapidly cooling said applied suspension below the cloud point with concurrent evaporation of said solvent to effect selective precipitation of at least 60 percent of said requisite wax content within a temperature drop of 10°F during the cooling from said solvent in said applied coating, and continuing evaporation of said solvent from said coating to provide a finished film having less than 10 percent of said wax-like material remaining in solution in the remaining solvent at a temperature of about 72°F.

3. The method as set forth in claim 2 wherein said solvent and wax-like material are characterized by a solubility curve such as to permit precipitation of at least 65 percent of the wax-like material initially dissolved in said solvent within a temperature drop of 10°F.

4. The method as set forth in claim 2 wherein said suspension comprises about ½ to 20 percent coloring matter, 20 to 50 percent filler and about 30 to 70 percent solvent having the requisite wax content of wax-like material initially dissolved therein.

5. The method as set forth in claim 4 wherein said solvent has about 5 to 30 percent by weight of wax-like material initially dissolved therein.

6. The method as set forth in claim 2 wherein said solvent is selected from the group consisting of naphtha, a blend comprising about 50 percent cycloparaffins, 30 percent paraffins and 20 percent toluene, and mixtures of ethyl alcohol and said blend.

7. The method as set forth in claim 2 wherein said wax-like material is selected from the group comprising carnauba wax, Montan wax, and mixtures thereof.

8. The method as set forth in claim 2 wherein said wax-like material is carnauba wax and said solvent is a blend comprising about 50 percent cycloparaffins, 30 percent paraffins and 20 percent toluene.

9. The method as set forth in claim 2 wherein said wax-like material is carnauba wax and said solvent is naphtha.

10. The method as set forth in claim 2 wherein said wax-like material is Montan wax and said solvent is a blend comprising about 50 percent cycloparaffins, 30 percent paraffins and 20 percent toluene.

11. The method as set forth in claim 2 wherein said wax-like material is Montan wax and said solvent is a mixture of ethyl alcohol and a blend comprising about 50 percent cycloparaffins, 30 percent paraffins and 20 percent toluene.

* * * * *